Patented Nov. 20, 1951

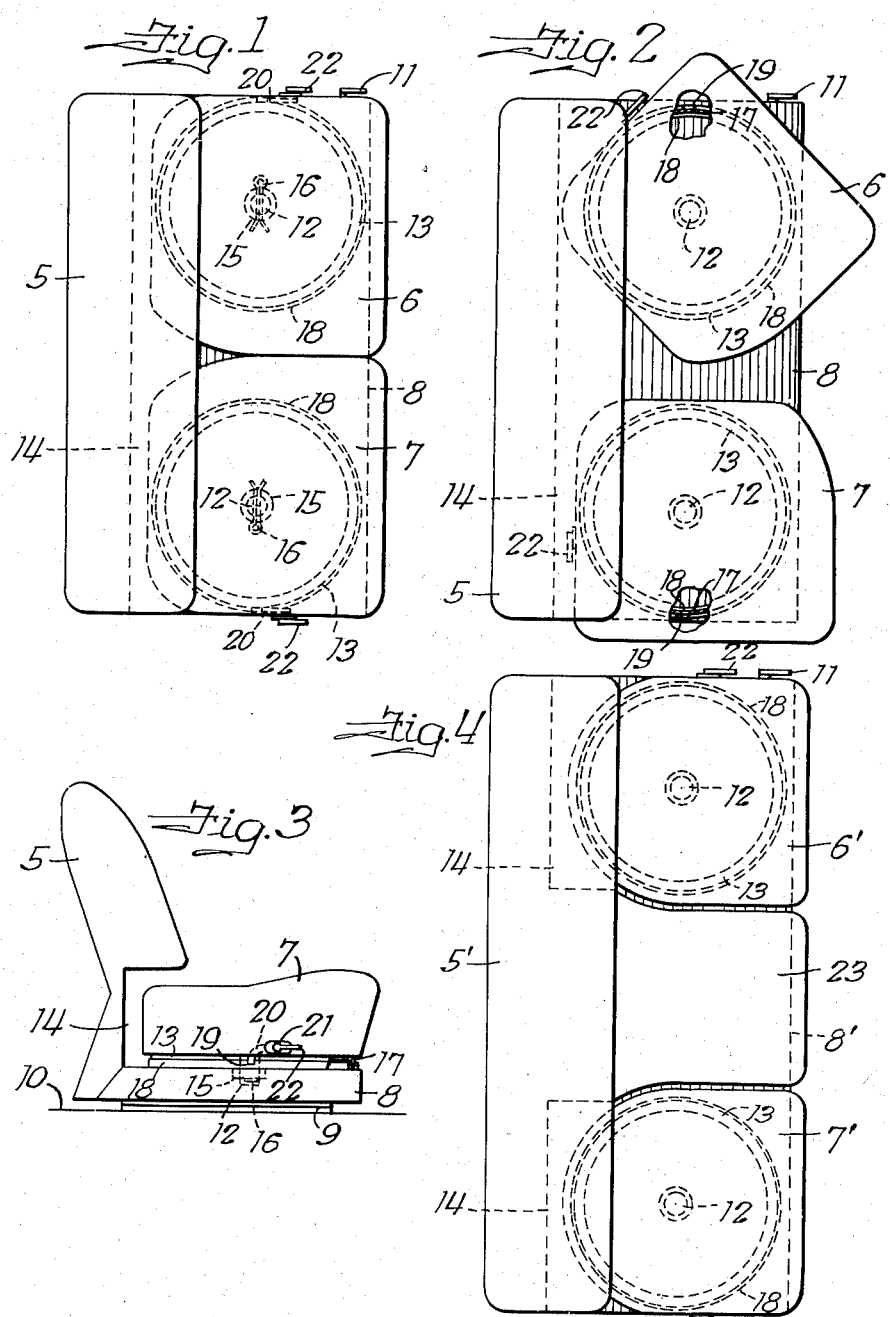

2,576,004

UNITED STATES PATENT OFFICE 2,576,004

SEMIREVOLVING VEHICLE SEAT

Glenn T. Fair, Belvidere, Ill.

Application January 11, 1946, Serial No. 640,407

8 Claims. (Cl. 155—97)

This invention relates to vehicle seats and is more particularly concerned with an improved semi-revolving type of seat.

There is considerable wear and tear on clothing and upholstery in the sliding to-and-fro on the front seat of an automobile in getting in or out and many serious accidents have been traceable to the awkwardness of the fixed type of seat, particularly in getting out of the car. Older people are quite apt to get a heel caught on a projecting bead on the floor next to the door opening due to the awkwardness of their exit with the fixed type of seat, whereas if the seat bottom were free to revolve, it would permit turning the body toward the door opening and getting the feet outside the car before alighting. Ladies, too, have noted a tendency for their dresses to cling to the upholstery, thus making their exit more or less undignified, whereas, with a revolving seat bottom, it would permit keeping the dress properly arranged all through the process of alighting. It is, therefore, the principal object of my invention to provide a vehicle seat having the conventional fixed back for simplicity and economy in construction, but having revolving seat bottoms, movable freely through about 90° from a normal position facing forward to an alighting position facing sidewise, whereby to eliminate all of the objections mentioned above.

Another object is to provide a vehicle seat of the kind mentioned in which the revolving seat bottoms have turntable supports for easy operation and have means for releasably locking the same in the normal position.

Still another object is to provide a three passenger front seat in which the middle seat bottom portion is fixed but the opposed side bottom portions are arranged to revolve in the manner described.

The invention is illustrated in the accompanying drawing, in which

Fig. 1 is a plan view of a vehicle seat made in accordance with my invention showing the revolving seat bottoms in normal position;

Fig. 2 is a similar view showing the seat bottoms in moved positions;

Fig. 3 is an end view of Fig. 1, and

Fig. 4 is a plan view of a three-passenger seat embodying my invention.

Similar reference numerals are applied to corresponding parts throughout these views.

Referring first to Figs. 1 to 3, the reference numeral 5 designates the fixed back portion of the seat which extends the full length thereof, and 6 and 7 are the revolving seat bottoms supported on a base portion 8 that is suitably constructed integral with the lower end of the back portion 5 and extends the full length of the seat. This base portion, like the base portion of conventional seats for automobiles and the like, may be mounted on the conventional seat slides indicated at 9 fastened to the floor 10 so as to permit fore-and-aft adjustment of the seat as a whole in the usual way. A lever 11 is provided on the base next to the driver's seat for unlocking the seat slides in the usual way when an adjustment is to be made.

The seat bottoms 6 and 7 have posts 12 extending downwardly from the bottom frames thereof in concentric relation to bearing rings 13 which form the upper rotary halves of turntables for rotary support of the seat bottoms, these turntables being in eccentric relation to the seat bottoms as clearly appears in Figs. 1 and 2 so that there is less room required for clearance purposes in the undercut lower portion 14 of the back 5 in the turning of the seat bottoms through approximately 90° from their normal position facing forwardly as in Fig. 1 to the alighting position illustrated by the seat bottom 7 in Fig. 2. The posts 12 extend through bearings 15 in the base portion 8 and have cotter pins 16 entered through diametrically extending holes in the lower end portions thereof to hold the seat bottoms in assembled operative position. The rings 13 each have a downwardly projecting annular flange 17 slidably received in the trough of a channel-shaped bearing ring 18 fastened to the frame of the base portion 8. The troughs of the rings 18 can be packed with graphite at the time of assembling the seat and that will afford good lubrication and make the seat bottoms turn easily throughout the life of the car without giving the turntables any further attention. Each of the rings 18 has one of its flanges notched at one point as indicated at 19 in Fig. 3 to receive a latch 20 that is pivoted at 21 on the frame of the seat bottom and is suitably spring pressed toward engagement in the notch 19 and arranged to be moved to released position by means of a lever 22. In that way, the person sitting on either of the seat bottoms 6 and 7 may, by depressing the lever 22, unlock the seat bottom for rotary movement and can turn the seat bottom to the right or left as the case may be to face outwardly for alighting. Once the latch 20 has been disengaged from the notch 19 and the seat bottom has been turned slightly, the lever 22 may be released without danger of relocking the seat bottom, because the latch will then ride freely along the top of the ring 18. This permits the turning of the seat bottom to the point where the lever 22 is disposed in the undercut portion 14 of the back as illustrated by the seat bottom 7 in Fig. 2. Afterward, the seat bottom 7 may be turned back to the normal position and the latch 20 will engage in the notch 19 and lock the seat bottom in the normal position facing forward as both seat bottoms are shown in Fig. 1.

It should be clear from the foregoing description that the revolving seat bottoms 6 and 7 will permit the driver and the passenger riding with him or her to get out of the car much more easily than with the conventional type of seat and without any of the objections mentioned before that apply to the conventional seats.

The three-passenger seat shown in Fig. 4 has a rigid back portion 5' and base portion 8' similarly as in the two-passenger seat described above, and the seat bottoms 6' and 7' correspond to the seat bottoms 6 and 7 of the other seat and are similarly pivoted and releasably locked. In this case, however, the middle portion 23 of the seat bottom is fixed in relation to the base 8' and is, of course, flush with the rotatable seat bottoms 6' and 7' on the front and top surfaces.

It is believed the foregoing description conveys a good understanding of the objects and advantages of my invention. The appended claims have been drawn to cover all legitimate modifications and adaptations.

I claim:

1. A plural passenger vehicle seat adapted for use as a front seat in an automobile comprising an elongated frame for support of a plurality of seat bottoms, a fixed back extending lengthwise of said frame and projecting upwardly from the rear portion thereof, the lower portion of the back being recessed on the front for seat bottom operating clearance, a pair of turntables mounted in the opposite end portions of said frame on substantially vertical axes the rear portions of which lie in said recess, and seat bottoms whose rear portions also project into said recess with operating clearance mounted for swivel operation on said turntables said seat bottoms forming the entire opposite end portions of the seat.

2. A plural passenger vehicle seat adapted for use as a front seat in an automobile comprising an elongated frame for support of a plurality of seat bottoms, a fixed back extending lengthwise of said frame and projecting upwardly from the rear portion thereof, the lower portion of the back being recessed on the front for seat bottom operating clearance, a pair of turntables mounted in the opposite end portions of said frame on substantially vertical axes the rear portions of which lie in said recess, and seat bottoms whose rear portions also project into said recess with operating clearance mounted eccentrically on said turntables for swivel operation, said seat bottoms forming the entire opposite end portions of the seat and the eccentricity of said turntables relative to said seat bottoms being toward the ends of said frame and the backs of the seat bottoms, substantially as and for the purpose described.

3. A plural passenger vehicle seat adapted for use as a front seat in an automobile comprising an elongated frame for support of a plurality of seat bottoms, a fixed back extending lengthwise of said frame and projecting upwardly from the rear portion thereof, a fixed seat bottom section in the middle portion of said elongated frame, the lower portion of the back being recessed on the front on opposite sides of said fixed seat bottom section for operating clearance for two end seat bottom sections, a pair of turntables for two end seat bottom sections mounted in the opposite end portions of said frame on substantially vertical axes, and end seat bottom sections whose rear portions project into said recesses with operating clearance mounted for swivel operation on said turntables, the end seat bottom sections forming the entire opposite end portions of the seat bottom and each being in abutting relation with said middle bottom section and shaped to cooperate therewith to form in effect a substantially continuous seat surface.

4. A plural passenger vehicle seat adapted for use as a front seat in an automobile comprising an elongated frame for support of a plurality of seat bottoms, a fixed back extending lengthwise of said frame and projecting upwardly from the rear portion thereof, a fixed seat bottom section in the middle portion of said elongated frame, the lower portion of the back being recessed on the front on opposite sides of said fixed seat bottom section for operating clearance for two end seat bottom sections, a pair of turntables for two end seat bottom sections mounted in the opposite end portions of said frame on substantially vertical axes, end seat bottom sections whose rear portions project into said recesses with operating clearance mounted for swivel operation on said turntables, the end seat bottom sections forming the entire opposite end portions of the seat bottom and each being in abutting relation with said middle bottom section and shaped to cooperate therewith to form in effect a substantially continuous seat surface, and separate manually operable latch means for releasably locking each of said turntables independently of the other with the seat bottom thereon facing forwardly.

5. A plural passenger vehicle seat adapted for use as a front seat in an automobile comprising an elongated frame for support of a plurality of seat bottoms, a fixed back extending lengthwise of said frame and projecting upwardly from the rear portion thereof, a fixed seat bottom section in the middle portion of said elongated frame, the lower portion of the back being recessed on the front on opposite sides of said fixed seat bottom section for operating clearance for two end seat bottom sections, a pair of turntables for two end seat bottom sections mounted in the opposite end portions of said frame on substantially vertical axes, end seat bottom sections whose rear portions project into said recesses with operating clearance mounted for swivel operation on said turntables, the end seat bottom sections forming the entire opposite end portions of the seat bottom and each being in abutting relation with said middle bottom section and shaped to cooperate therewith to form in effect a substantially continuous seat surface, and seat slides under the lower portion of the elongated frame permitting forward and rearward adjustment of the seat as a whole independently of the swivel action of said seat bottoms.

6. A plural passenger vehicle seat adapted for use as a front seat in an automobile comprising an elongated frame for support of a plurality of seat bottoms, a fixed back extending lengthwise of said frame and projecting upwardly from the rear portion thereof, a fixed seat bottom section in the middle portion of said elongated frame, the lower portion of the back being recessed on the front on opposite sides of said fixed seat bottom section for operating clearance for two end seat bottom sections, a pair of turntables for two end seat bottom sections mounted in the opposite end portions of said frame on substantially vertical axes, end seat bottom sections whose rear portions project into said recesses with operating clearance mounted for swivel operation on said turntables, the end seat bottom sections forming the entire opposite end portions of the seat bottom and each being in abutting relation with said middle bottom section and shaped to cooperate therewith to form in effect a substantially continuous seat surface, separate manually operable latch means for releasably locking each of said turntables independently of the other with the seat bottom thereon facing forwardly, and seat slides under the lower portion of the elongated frame permitting forward and rearward adjustment of the seat as a whole independently of the swivel action of said seat bottoms.

7. A plural passenger vehicle seat adapted for use as a front seat in an automobile comprising an elongated frame for support of a plurality of seat bottoms, a fixed back extending lengthwise of said frame and projecting upwardly from the rear portion thereof, the lower portion of the back being recessed on the front for seat bottom operating clearance, a pair of turntables mounted in the opposite end portions of said frame on substantially vertical axes the rear portions of which turntables lie in said recess, seat bottoms each of which forms one complete end portion of the seat and whose rear portions also project into said recess with operating clearance mounted for swivel operation on said turntables, and separate manually operable latch means for releasably locking each of said turntables independently of the other with the seat bottom thereon facing forwardly.

8. A plural passenger vehicle seat adapted for use as a front seat in an automobile comprising an elongated frame for support of a plurality of seat bottoms, a fixed back extending lengthwise of said frame and projecting upwardly from the rear portion thereof, the lower portion of the back being recessed on the front for seat bottom operating clearance, a pair of turntables mounted in the opposite end portions of said frame on substantially vertical axes the rear portions of which turntables lie in said recess, seat bottoms each of which forms one complete end portion of the seat and whose rear portions also project into said recess with operating clearance mounted for swivel operation on said turntables, separate manually operable latch means for releasably locking each of said turntables independently of the other with the seat bottom thereon facing forwardly, and seat slides under the lower portion of the elongated frame permitting forward and rearward adjustment of the seat as a whole independently of the swivel action of said seat bottoms.

GLENN T. FAIR.

REFERENCES CITED

The following references are of record in the file of this patent:

UNITED STATES PATENTS

| Number | Name | Date |
| --- | --- | --- |
| 594,296 | Stott | Nov. 23, 1897 |
| 1,138,802 | Shermer | May 11, 1915 |
| 1,188,706 | Wall | June 27, 1916 |
| 1,682,989 | Smelker | Sept. 4, 1928 |

FOREIGN PATENTS

| Number | Country | Date |
| --- | --- | --- |
| 242,072 | Great Britain | Nov. 5, 1925 |
| 520,825 | Great Britain | May 6, 1940 |
| 94,861 | Sweden | Mar. 1, 1939 |